United States Patent [19]

Free

[11] 3,974,077

[45] Aug. 10, 1976

[54] FRACTURING SUBTERRANEAN FORMATION

[75] Inventor: Dustin L. Free, Tulsa, Okla.

[73] Assignee: The Dow Chemical Company, Midland, Mich.

[22] Filed: Sept. 19, 1974

[21] Appl. No.: 507,520

[52] U.S. Cl. .......................... 252/8.55 R; 166/283; 166/308; 252/316
[51] Int. Cl.² ........................................ E21B 43/26
[58] Field of Search ............... 252/8.55 R, 316; 106/208; 166/283, 308

[56] References Cited

UNITED STATES PATENTS

| | | | |
|---|---|---|---|
| 3,058,909 | 10/1962 | Kern | 252/8.55 |
| 3,251,781 | 5/1966 | Jordan | 252/316 |
| 3,301,723 | 1/1967 | Chrisp | 252/316 X |
| 3,615,794 | 10/1971 | Nimerick | 106/208 |
| 3,763,934 | 10/1973 | Coulter et al. | 166/294 |
| 3,768,566 | 10/1973 | Ely et al. | 166/283 X |

*Primary Examiner*—Herbert B. Guynn
*Attorney, Agent, or Firm*—Bruce M. Kanuch; Glenn H. Korfhage

[57] ABSTRACT

As an aqueous fracturing fluid is pumped into a well bore penetrating a subterranean formation a galactomannan gum, a buffer which promotes an initial acidic pH in the fluid, a borate ion releasing compound and a compound which functions to shift the pH of the fluid to the basic side after a certain short period of time are dispersed into the fluid. The resulting viscous fracturing fluid is employed to fracture a subterranean formation to, for example, stimulate the flow of fluids therefrom.

11 Claims, No Drawings

3,974,077

FRACTURING SUBTERRANEAN FORMATION

BACKGROUND OF THE INVENTION

The use of aqueous based fluids to fracture subterranean formations to increase the flow of fluids therefrom (e.g., oil, gas, water, etc.) is a well-known art. In many instances the aqueous based fluid is treated to increase its viscosity and solids carrying ability to increase the efficiency of the process. In one such process (Kern, U.S. Pat. No. 3,058,909) a complex of a polyorganic compound having at least one reactive unit consisting of two adjacent hydroxyl groups arranged in a "cis" configuration, e.g., a galactomannan gum, and a boron compound capable of supplying borate ions in the aqueous solution are added to the aqueous fluid. In the Kern process, however, holding tanks and critical time periods are involved since it was thought at that time that the gum must be permitted to hydrate for an appreciable length of time in the solution at an acidic $pH$ prior to crosslinking the gum with borate at a basic $pH$ value. The reasoning exemplified by Kern was based on the following known facts. First, a galactomannan gum will not hydrate when it is dispersed into an alkaline aqueous solution which contains borate ions. This characteristic is sometimes employed to aid in dispersing the gum since its tendency to agglomerate is reduced. Also, it is known that if the $pH$ of an alkaline solution containing a gum and borate ions is adjusted to an acidic value, the gum will hydrate but it will not crosslink to form a gel. However, after the gum is permitted to hydrate at an acidic $pH$ value it will become crosslinked if the $pH$ of the solution is then shifted back to a basic value. Therefore, those skilled in the art, e.g., Kern, have taught to first disperse the gum into an acidic aqueous fluid containing borate ions; allow it to hydrate; add a base, e.g., NaOH, to adjust the $pH$ to a basic value after the gum has hydrated; and only then can the boron compound crosslink the gum. This process is successful for small scale uses. However, in oil or gas fields where such aqueous fluids are to be employed as fracturing fluids in large volumes, holding tanks and the time delay involved may rule out such a process because of economic and other considerations, e.g., size of holding tanks required and the like.

However, borate crosslinked galactomannan aqueous fluids are very useful in fracturing techniques. Therefore, it would be desirable if a method were available for employing the borate-gum system in a continuous, i.e., "on the fly" method so that while an aqueous fluid is being introduced into and through the borehole which penetrates the subterranean formation, the gum could be hydrated and crosslinked. The present invention concerns such an on the fly process.

Other relevant art includes U.S. Pat. Nos. 3,096,284; 2,868,664; 3,615,794; 3,740,360; 3,763,934 and 3,766,984, the teachings of which are specifically incorporated herein by reference.

SUMMARY OF THE INVENTION

The present invention concerns a method of fracturing a subterranean formation, such as, for example, to aid in recovering petroleum fluids therefrom. In the process specific constituents are dispersed into an aqueous fluid as it is being introduced into and through a borehole (on the fly) which penetrates the subterranean formation. The constituents comprise a galactomannan gum, a buffer to adjust the initial $pH$ of the aqueous fluid to an acid value, a borate releasing compound and a compound which adjusts the $pH$ of the fluid from acid to basic after a certain period of time (a few seconds to a few minutes) sufficient to permit the gum to hydrate at the acidic $pH$ value. Then because of the shift in the $pH$ to a basic value the borate crosslinking mechanism is activated thereby forming a viscous gel. This sequence of steps occurs while the aqueous fluid is being pumped into a borehole so that the viscosity of the aqueous fluid reaches a suitable value prior to it reaching the face of the formation to be fractured. It has been discovered that the normal long hydration period can be drastically reduced by practicing the method of the present invention.

DETAILED DESCRIPTION OF THE INVENTION

Galactomannan gums as employed in the present invention are those natural gums, derivatives and modifications of galactomannan gums which are characterized as containing a backbone consisting essentially of mannos units having various amounts of galactos units attached to the linear backbone formed by the mannos units. These gums are also characterized as having cis hydroxyl groups. Many of the useful commercial forms of galactomannans comprise a mixture of polymeric units containing different linear chain lengths and different ratios of galactos units to mannos units. Typical of natural galactomannans which can be employed in the practice of the present invention are guar gum, locust bean gum, gums derived from endosperm seeds such as the sinkas, brazelwood, tara, honey locust, and the like. Well-known modifications can be made to these natural galactomannans to produce various results such as greater stability at elevated temperatures, greater solubility in water at certain temperatures, and the like. Various modifications and derivatives of galactomannans which are useful include, for example, hydroxyalkyl galactomannans, carboxyalkyl galactomannans, hydroxyalkyl carboxyalkyl galactomannans and the like. Specific derivatives which may be employed in the practice of the present invention include, for example, hydroxypropyl guar, hydroxyethyl guar, hydroxyethyl carboxymethyl guar and caboxymethyl guar and similar water soluble derivatives known in the art. Examples of such gums are guar gums sold in commerce under the trademark JAGUAR by Stein Hall and as XO 362 by General Mills.

It is well-known that galactomannan gums generally hydrate most rapidly in aqueous solutions which have a pH value within the range of neutral to slightly acidic. Each type of gum may have a pH range wherein this hydration occurs most rapidly. It is, therefore, preferred in the practice of the present invention that a buffer be employed to adjust the initial pH of the solution into which the gum is to be dispersed to a value within this preferred range. Simple laboratory tests can be made to determine for any particular gum the preferred hydration pH range. Suitable buffers include, for example, mixture of a salt of a weak acid and an organic acid, e.g., sodium carbonate and fumaric acid; sodium acetate and citric acid; sodium citrate and citric acid; monosodium phosphate; sodium acetate and fumaric acid and the like.

The weight ratio of the salt of a weak acid and organic acid can be varied to provide the desired buffered pH.

It is also known that different gums may require different periods of time to hydrate sufficiently to be effectively crosslinked. It is preferred to employ a gum which hydrates within a time period of from a few seconds to a few minutes so that the aqueous fluid becomes gelled prior to contacting the face of the subterranean formation.

For crosslinking to occur, however, the aqueous fluid in which the gum and borate ions are dispersed must have a basic pH value. Therefore, there is also added to the aqueous fluid a compound which neutralizes the buffering action of the buffer and changes the pH of the solution from acidic to basic only after the gum has become sufficiently hydrated to be properly crosslinked. Compounds which can be employed include basic materials which have a characteristic delayed solubility rate in the aqueous fluid such as MgO, barium oxide, calcium oxide and/or other basic compounds which are treated or coated with a material (e.g., a wax, etc.) to delay their effect on the pH of the aqueous fluid. These basic compounds include sodium hydroxide, sodium carbonate, sodium bicarbonate coated with polyethylene glycol, wax and the like. The basic material is employed in an amount sufficient to neutralize the acidic pH of the fluid and render the fluid slightly basic; a pH of from about 8 to about 10 is preferred.

Borate ion releasing compounds which can be employed include, for example, any boron compound which will supply borate ions in the aqueous fluid, for example, boric acid, sodium diborate, potassium tetraborate, sodium tetraborate, pentaborates and the like.

The borate ion may also be added as part of a borate treated galactomannan gum. Such borated gums include, for example, those taught in U.S. Pat. No. 2,868,644, the teachings of which are specifically incorporated herein by reference.

Each of the constituents may be employed in widely varying amounts. The amount of each is dependent both on the quantity of the other constituents and also upon the desired characteristics of the aqueous fracturing fluid.

Generally, a sufficient quantity of the galactomannan gum is employed to provide a viscous fluid having a viscosity measured at 75°F with a Fann Model Viscometer at 100 rpm ranging from about 20 to 2000 centipoise (cps). The amount of gum will also depend to some degree on the temperature of the aqueous fluid both initially and at the temperature it is raised to as it descends into the wellbore. Generally, for similar viscosity characteristics, a greater quantity of gum is required at higher temperatures. In the practice of the present invention the gum is employed in an amount ranging from about 20 to about 100 pounds per 1000 gallons of aqueous fluid. The exact amount depends on the precise gum employed, the desired viscosity, the temperature of the fluid and other well-known parameters which effect such limits such as salt content of the fluid and the like.

Sufficient buffer is employed to adjust the initial pH of the aqueous fluid to within the preferred pH hydration range of the particular gum employed. Since local waters having a wide range of pH's and mineral content are employed in the field for fracturing operations the amount of buffer to be employed will need to be checked for each individual fracturing job.

Once the amount of buffer is determined the amount of basic material necessary to neutralize and adjust the pH of the basic value can easily be calculated.

Any two or more of the constituents, i.e., gum, buffer, basic compound and borate can be premixed as granulated solids and dispersed into an aqueous fracturing fluid. It has been found that certain of the constituents may present stability problems if preblended and left for a period of time prior to their dispersion into water. Therefore, for any particular mixture stability tests should be performed prior to use. Preferably the borate compound is not premixed with the remainder of the constituents since the mixture appears to be unstable.

When the aqueous fluid comprises a brine having a pH of from about 5 to about 7.5 and a temperature at mixing ranging from about 60° to 90°F, a granulated mixture containing as percent by weight, 80 percent of a fast hydrating guar gum, 6.7 percent anhydrous sodium acetate, 3.3 percent citric acid monohydrate, 8.0 percent magnesium oxide and 2 percent silica flour can be premixed and employed to gel an aqueous fluid to which has been added a borate ion releasing compound. The borate ion releasing compound is employed in an amount of between about 1 to 10 percent by weight of the gum. This mixture is metered into the aqueous fluid in any convenient manner (such as with a disperser) in an amount preferably ranging from about 30 to about 80 pounds of mixture per 1000 gallons of aqueous fluid, depending on the viscosity desired.

The silica flour is added as a fluid loss additive, a well-known desired functional characteristic, employed to prevent leak off of the fracturing fluid to more permeable portions of the formation. Other fluid loss agents can also be employed.

Other materials employed in fracturing fluids for known functional purposes may also be employed such as, scale inhibitors, fluid loss additives, propping agents, breakers which degrade the gel after its intended use and the like. Also, the premix may contain other granulated solids which function to stabilize and prevent caking of the mixture. These include, for example, fumed silicon dioxide, and the like.

The following is a description of an actual practice of the present invention.

EXAMPLE 1

A water well located in Wyoming having a depth of approximately 4500 feet was fractured employing the method of the present invention. After the well was pressurized to 1000 psi (a standard procedure to balance the pressure across a packer) approximately 240 barrels of water gelled with 20 pounds of guar gum per 1000 gallons of water were injected into the well at a rate of 20 barrels per minute to initiate and propogate a fracture. Following the above, 48 barrels of a composition of the present invention were pumped into the well followed by 680 barrels of the same fluid to which was added in stages various quantities and size distribution of sand as a proppant. The fracturing fluid was displaced from the tubing with 100 barrels of a 2 percent by weight potassium chloride solution. The entire 728 barrels of fracturing fluid of the present invention were prepared by metering into an aqueous fluid as it was being pumped into a well; first, boric acid at a concentration of 1.2 pounds per 1000 gallons of fluid followed by the addition of 60 pounds per 1000 gallons of a granulated mixture containing as percent by weight, 87 percent of guar gum, 4.8 percent of sodium acetate, 2.4 percent anhydrous citric acid, and 5.8 percent of magnesium oxide. The fracturing of this water supply well was considered a complete success as evidenced by a producing capability of 12,000 to 13,000 barrels of water per day after fracturing.

EXAMPLE 2

An oil producing well was fractured employing an aqueous fracturing fluid prepared in the manner described in Example 1. 107,000 Gallons of the fracturing fluid were employed. The well was producing ≈120 barrels of oil per day before the treatment and 510 barrels per day of oil following the treatment.

In the laboratory a granulated mixture containing 3.6 grams of guar gum; 0.11 gram magnesium oxide; 0.072 gram boric acid and 0.3 gram of a mixture of 2 parts by weight of fumaric acid and 1 part by weight of sodium carbonate were simultaneously added to 500 mls of tap water in a Waring blender set at low speed. The pH of the solution was measured over a period of time as well as a visual observation made of the condition of the solution. The observations are reported in the following Table I.

TABLE I

| Time Minutes | pH | Remarks |
| --- | --- | --- |
| 3 | — | Thicker than guar gum alone at concentrations of 60 lbs/1000 gallons |
| 4 | 6.8 | |
| 5 | 7.3 | Some gelation consistency |
| 5.5 | — | Gel structure observed |
| 7 | 8.0 | Gelled |
| >7 | — | Continual gelling and viscosity increase |

Three different granulated mixtures were prepared as follows:

A. 3.6 Grams of guar gum; 0.49 gram of magnesium oxide; 0.3 gram of a mixture of 55 percent by weight of fumaric acid and 45 percent by weight of sodium carbonate; and 0.72 gram of boric acid.

B. Same as A except 0.15 gram of the buffer mixture.

C. Same as A except 0.6 gram of the buffer mixture.

These mixtures were added to 500 mls of water at a temperature of about 74°F and the pH and viscosity in centipoise (cps) (determined with a Fann Model Viscometer at 100 rpm) were recorded over a period of time. The results are reported in the following Table II.

TABLE II

| Time Minutes | A pH | A cps | B pH | B cps | C pH | C cps |
| --- | --- | --- | --- | --- | --- | --- |
| 2 | 7.0 | 69 | 7.8 | 30 | 7.1 | 105 |
| 3 | 7.1 | 96 | 8.0 | 36 | 7.2 | 135 |
| 4 | 7.3 | 101 | 8.2 | 42 | 7.4 | 162 |
| 5 | 7.4 | 117 | 8.3 | 48 | 7.7 | 180 |
| 7 | 7.8 | 129 | 8.4 | 96 | 7.9 | 231 |
| 10 | 8.0 | 141 | 8.5 | 141 | 8.1 | 489 |
| 12 | 8.1 | 156 | 8.5 | 210 | 8.2 | 630 |
| 14 | 8.2 | 225 | 8.6 | 285 | 8.2 | 750 |
| 15 | 8.7 | 330 | 8.6 | 345 | — | — |
| 16 | 8.3 | 495 | 8.7 | 375 | — | — |
| 17 | 8.3 | 810 | 8.8 | 375 | — | — |
| 17.25 | 8.3 | 900+ | — | — | — | — |

In another series of tests a premix formulation containing 240 grams (gm.) of guar gum; 10 grams citric acid; 20 grams sodium acetate; 24 grams of magnesium oxide and 6 grams of silica flour was prepared. Three grams of this premix were mixed with 500 mls of various aqueous solutions containing 2 mls of a 0.036 gram $H_3BO_3$/ml $H_2O$ solution and mixed in a Waring blender for one minute. The pH and the viscosity of the solution was then measured starting approximately 1½ minutes following the introduction of the 3 gram premix into the water. The viscosity was determined with a HBT Brookfield Viscometer at 50 rpm and with a Spindle No. 1. The solutions were at a temperature ranging from about 71° to 75°F. The results of these tests are set forth in the following Table III.

The results of these tests demonstrate that the introduction of the described constituents into a fracturing fluid flowing into a wellbore can be successfully employed to provide a fluid having sufficient viscosity to carry a propping agent.

TABLE III

| Time Min:Sec | Tap $H_2O$ pH | Tap $H_2O$ Visc | Tap $H_2O$ pH | Tap $H_2O$ Visc | 1% KCl** pH | 1% KCl** Visc | Aqueous Solution 1% KCl pH | 1% KCl Visc | API Brine* pH | API Brine* Visc | API Brine pH | API Brine Visc | 1% $CaCl_2$ pH | 1% $CaCl_2$ Visc | 1% $CaCl_2$ pH | 1% $CaCl_2$ Visc |
| --- | --- | --- | --- | --- | --- | --- | --- | --- | --- | --- | --- | --- | --- | --- | --- | --- |
| :15 | 6.35 | — | 6.31 | — | 7.8 | — | 5.95 | — | 5.58 | — | 5.65 | — | 5.5 | — | 5.41 | — |
| :30 | 6.60 | — | 6.70 | — | 6.18 | — | 5.95 | — | 5.48 | — | 5.78 | — | 5.65 | — | 5.51 | — |
| :45 | 7.36 | — | 7.48 | — | 6.87 | — | 6.60 | — | 5.95 | — | 6.49 | — | 5.90 | — | 5.72 | — |
| 1:00 | 7.80 | — | 7.91 | — | 7.70 | — | 7.60 | — | 6.65 | — | 7.1 | — | 6.31 | — | 6.00 | — |
| 1:30 | 8.30 | 6.0 | — | — | 8.25 | 6.5 | 8.25 | 7.5 | 7.5 | 5.5 | 7.7 | 6.0 | — | — | 7.55 | — |
| 1:45 | 8.40 | 7.0 | 8.4 | 7.0 | 8.4 | — | 8.38 | 10.0 | — | — | 7.83 | 7.0 | 8.01 | 6.0 | 7.85 | 6.0 |
| 2:00 | 8.50 | 9.0 | 8.6 | 10.0 | 8.5 | 18.5 | 8.49 | 70.0 | 7.79 | 7.0 | 7.95 | 8.0 | 8.20 | 6.5 | 8.08 | 6.0 |
| 2:15 | 8.58 | 24.0 | 8.68 | 33.0 | 8.6 | 92.0 | 8.61 | 80.5 | 7.91 | 8.0 | 8.05 | 8.5 | 8.32 | 8.5 | 8.19 | 7.0 |
| 2:30 | 8.64 | 92.0 | 8.75 | 100+ | 8.6 | 100+ | 8.65 | 100+ | 8.02 | 8.5 | 8.15 | 9.5 | 8.45 | 9.0 | 8.29 | 7.5 |
| 2:45 | 8.70 | 100+ | — | — | — | — | — | — | 8.10 | 9.5 | 8.21 | 11.0 | 8.50 | 10.0 | 8.35 | 8.5 |
| 3:00 | — | — | — | — | — | — | — | — | 8.19 | 10.5 | 8.30 | 12.5 | 8.55 | 12.5 | 8.41 | 10.0 |
| 3:15 | — | — | — | — | — | — | — | — | 8.25 | 12.0 | 8.40 | 14.0 | 8.60 | 15.5 | 8.49 | 12.0 |
| 3:30 | — | — | — | — | — | — | — | — | 8.32 | 14.0 | 8.45 | 18.5 | 8.65 | 24.0 | 8.52 | 15.5 |
| 3:45 | — | — | — | — | — | — | — | — | 8.40 | 17.0 | 8.52 | 27.5 | 8.70 | 48.5 | 8.60 | 22.5 |
| 4:00 | — | — | — | — | — | — | — | — | 8.48 | 24.5 | 8.60 | 46.5 | 8.75 | 99 | 8.64 | 36.0 |
| 4:30 | — | — | — | — | — | — | — | — | 8.59 | 50.5 | 8.70 | 100+ | 8.80 | 100+ | 8.72 | 100+ |
| 5:00 | — | — | — | — | — | — | — | — | 8.70 | 100+ | — | — | — | — | — | — |

*API Brine is 8% by weight NaCl, 2.5% $CaCl_2$ aqueous solution
**All per cents are per cent by weight

What is claimed is:

1. A method of fracturing a subterranean formation penetrated by a borehole which comprises:

a. providing a flowing stream of an aqueous fluid;

b. providing a compound in said fluid for releasing borate ions into said fluid prior to or substantially concurrently with injection of the components recited in clause (c);

c. substantially continuously formulating a fracturing fluid by substantially continuously injecting into the flowing aqueous stream:

1. a galactomannan gum,
2. a buffer which produces an initial acidic pH in the fluid, and
3. a delayed action basic compound to neutralize said buffer and produce a basic pH in said fluid after a period of time sufficient both to permit introduction of said fluid into the borehole while still at an acidic pH to permit said gum to hydrate, yet within a time period such that said hydrated gum is crosslinked with said borate ion prior to reaching said formation, the amounts of said borate ion, gum, buffer, and basic compound employed being sufficient to form a fracturing fluid;

d. substantially as said fracturing fluid is formulated and while the *p*H of the fluid is still acidic, introducing a quantity of said fracturing fluid into the borehole sufficient for fracturing the formation;

e. permitting the pH of the introduced fluid to change from acidic to basic before said introduced fluid is brought into contact with the formation, thereby effecting borate crosslinking of the gum; and f. contacting the formation with said fluid containing crosslinked gum, under sufficient pressure to fracture the formation.

2. The method of claim 1 wherein the basic compound is magnesium oxide.

3. The method of claim 1 wherein said constituents (1)–(3) and said compound for releasing borate ions are in the form of a premixture of granulated solids which are dispersed simultaneously into said aqueous fluid.

4. The method of claim 1 wherein the borate releasing compound is separately dispersed into said aqueous fluid and the constituents recited in clause (c) are dispersed into said fluid as a premixture of granulated solids.

5. The method of claim 1 wherein a sufficient quantity of the base is employed to adjust the *p*H of said fluid to within the range of about 8 to about 10.

6. The method of claim 1 wherein said borate releasing compound is boric acid.

7. The method of claim 1 wherein said gum is guar gum, said borate releasing compound is boric acid, said buffer is a mixture of a salt of weak acid and an organic acid, and said basic compound is magnesium oxide.

8. The method of claim 7 wherein said boric acid is dispersed into said aqueous fluid followed by dispersing into said fluid a granulated mixture of said buffer, magnesium oxide and guar gum.

9. The method of claim 7 wherein said gum is dispersed into said aqueous fluid in a concentration equivalent to about 20 to about 100 pounds per 1000 gallons of said aqueous fluid.

10. The method of claim 1 wherein said aqueous fluid has a temperature ranging from about 60° to about 90°F and has a *p*H value of from about 5 to about 7.5, said borate releasing compound comprises boric acid, said buffer comprises a mixture of citric acid and anhydrous sodium acetate, said basic compound comprises magnesium oxide and said gum comprises guar gum, wherein said boric acid is dispersed into said aqueous fluid separate from said other constituents and said magnesium oxide, said gum and said buffer are dispersed into said aqueous fluid as a premixture of granulated solids.

11. The method of claim 1 wherein the borate releasing compound is injected into the flowing aqueous stream substantially concurrently with the components recited in clause (c).

* * * * *

UNITED STATES PATENT AND TRADEMARK OFFICE
CERTIFICATE OF CORRECTION

PATENT NO. : 3,974,077
DATED : August 10, 1976
INVENTOR(S) : Dustin L. Free

It is certified that error appears in the above-identified patent and that said Letters Patent are hereby corrected as shown below:

Column 1, line 21, after "with" add --the--.

Column 1, line 55, after the word "such", delete the word "an".

Column 1, line 55, add quotation marks before "on" and after "fly", --"on the fly"--.

Column 1, line 67, change "(on the fly)" to --("on the fly")--.

Column 2, line 10, delete the word "a" and insert --the--.

Column 2, line 45, change last word of line from "caboxymethyl" to --carboxymethyl--.

Column 2, line 61, change "mixture" to --mixtures--.

Column 4, line 66, change "a", first occurrence, to --the--.

Column 7, line 8 of Claim 1, add the word --and-- after "pH".

Signed and Sealed this

Ninth Day of November 1976

[SEAL]

Attest:

RUTH C. MASON
*Attesting Officer*

C. MARSHALL DANN
*Commissioner of Patents and Trademarks*